United States Patent
Tan et al.

(10) Patent No.: US 9,848,288 B2
(45) Date of Patent: Dec. 19, 2017

(54) BLUETOOTH PAIRING SYSTEM, METHOD, AND APPARATUS

(71) Applicant: Certis Cisco Security PTE LTD, Certis Cisco Centre (SG)

(72) Inventors: Poh Beng Tan, Singapore (SG); Martin James Baptist, Singapore (SG); Keen Hon Wong, Singapore (SG); Honching Lui, Singapore (SG); Xiang Li, Singapore (SG)

(73) Assignee: Certis Cisco Security PTE LTD, Certis Cisco Centre (SG)

( * ) Notice: Subject to any disclaimer, the term of this patent is extended or adjusted under 35 U.S.C. 154(b) by 0 days.

(21) Appl. No.: 15/265,503

(22) Filed: Sep. 14, 2016

(65) Prior Publication Data

US 2017/0006416 A1    Jan. 5, 2017

Related U.S. Application Data

(62) Division of application No. 14/380,517, filed as application No. PCT/SG2012/000316 on Sep. 4, 2012, now Pat. No. 9,609,677.

(30) Foreign Application Priority Data

Jun. 20, 2012    (SG) .............................. 201204588-6

(51) Int. Cl.
*H04B 7/00* (2006.01)
*H04W 4/00* (2009.01)
(Continued)

(52) U.S. Cl.
CPC ........... *H04W 4/008* (2013.01); *H04W 12/04* (2013.01); *H04W 12/06* (2013.01); *H04W 12/08* (2013.01); *H04W 76/023* (2013.01); *H04W 84/18* (2013.01)

(58) Field of Classification Search
CPC ...... H04W 4/008; H04W 12/04; H04W 12/06
(Continued)

(56) References Cited

U.S. PATENT DOCUMENTS

| 8,964,298 | B2 * | 2/2015 | Haddick ................. G06F 3/013 359/630 |
| 2011/0029720 | A1 * | 2/2011 | Lu ....................... G06F 12/0246 711/103 |

\* cited by examiner

*Primary Examiner* — Eugene Yun
(74) *Attorney, Agent, or Firm* — Saliwanchik, Lloyd & Eisenschenk

(57) ABSTRACT

The system provides secure controlled access to multiple Bluetooth devices issued to users. For example an officer may be issued a weapon. To enable monitoring of weapon status, a Bluetooth sensor may be fitted to a holster and the Officer issued with a Bluetooth enabled mobile phone. In order to establish a secure Bluetooth connection between the devices, sensor contains a restored link key and the mobile phone stores a partial link key. The supervisor enters their username and password, and a secret key into the phone which is then used with the partial link key to generate a copy of the link key stored in the first device, so that a secure connection can be established with the first device. The officer enters their username and password into the sensor, and once the secure connection is established it is sent over the secure connection to the mobile phone which then sends both user names and passwords to a verification authority. If the officer is verified and authorized to issue the devices, an authorization message is returned and use of the devices allowed. If the authorization fails, a failure message is returned and the devices are not issued and features may be blocked. The verification authority may be internal or external to the phone. If the authority is external, then the supervisor's user name and password could be omitted.

7 Claims, 2 Drawing Sheets

(51) Int. Cl.
*H04W 12/08* (2009.01)
*H04W 12/04* (2009.01)
*H04W 12/06* (2009.01)
*H04W 76/02* (2009.01)
*H04W 84/18* (2009.01)

(58) Field of Classification Search
USPC .................................................. 455/41.2
See application file for complete search history.

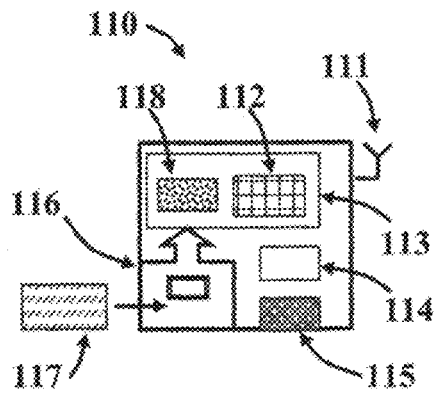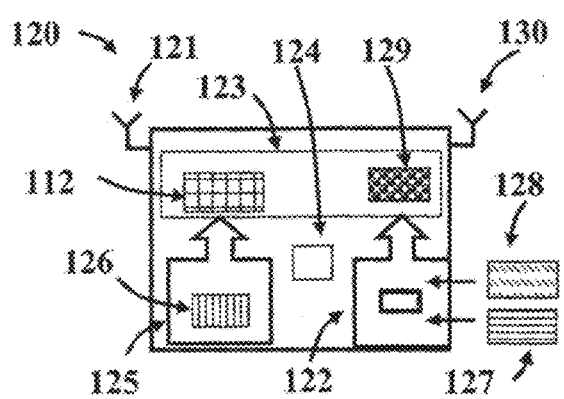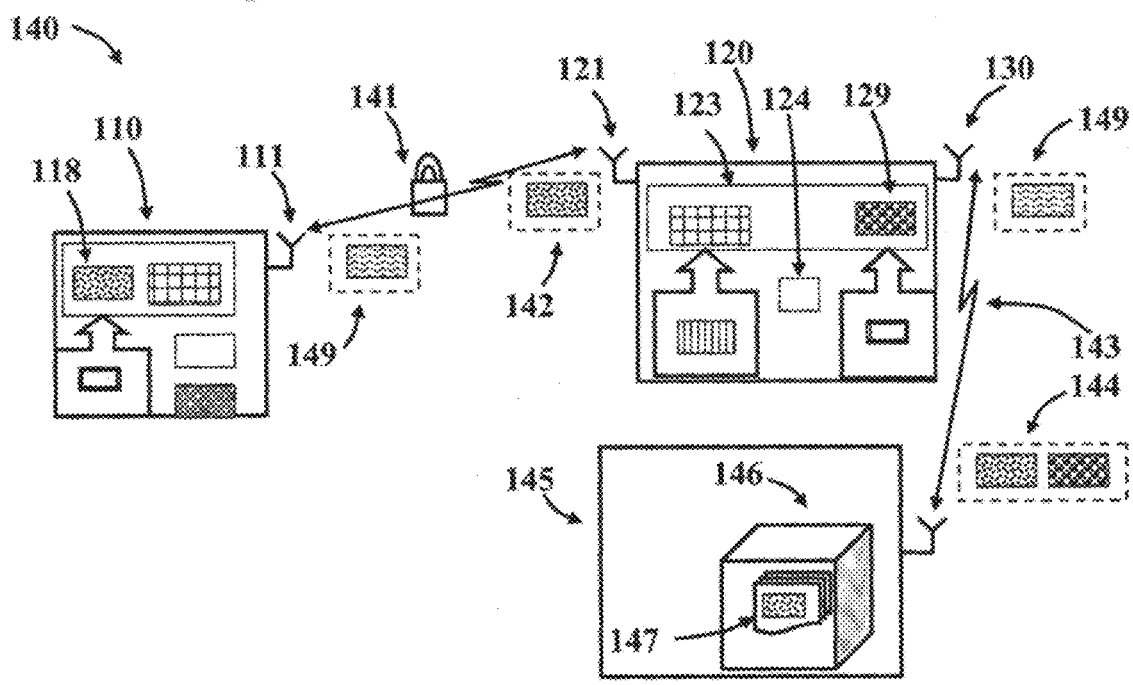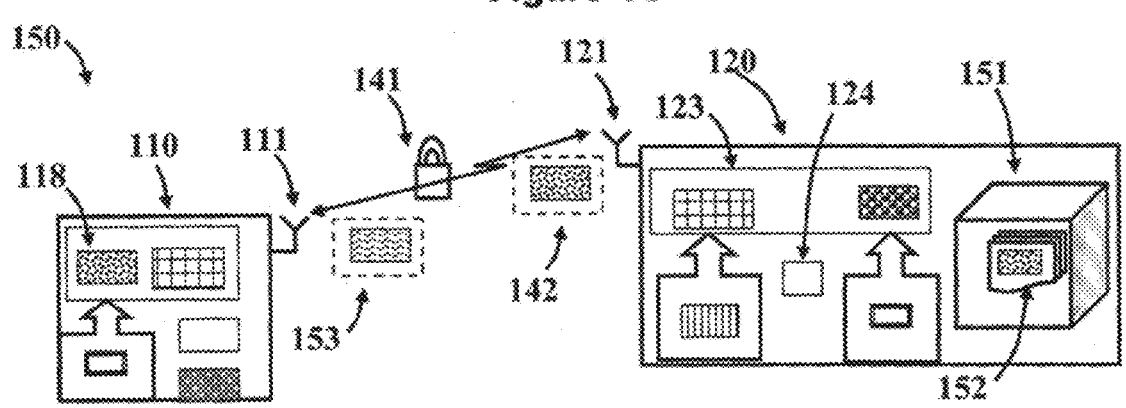

BLUETOOTH PAIRING SYSTEM, METHOD, AND APPARATUS

CROSS-REFERENCE TO RELATED APPLICATIONS

This application is a divisional of U.S. application Ser. No. 14/380,517, filed Nov. 6, 2014, which is the U.S. national stage application of International Patent Application No. PCT/SG2012/000316, filed Sep. 4, 2012; which claims priority to Singapore Application No 201204588-6, filed Jun. 20, 2012, the disclosures of each of which are incorporated herein by reference in their entirety.

FIELD OF THE INVENTION

The present invention relates to Bluetooth enabled apparatuses and in one particular form relates to methods for controlling access to a Bluetooth apparatus.

INCORPORATION BY REFERENCE

The following documents are referred to in the present specification:

Singaporean Patent Application Number 2008057382 (granted as Singapore Patent No. 158780).

The entire content of this document is hereby incorporated by reference.

BACKGROUND OF THE INVENTION

The Specification of the Bluetooth System (hereafter referred to as the Bluetooth specification) defines a short range wireless communication system. The system uses frequency hopping spread spectrum technology in the unlicensed Industrial, Scientific, and Medical (ISM) 2.4 GHz short-range radio frequency band. Bluetooth is primarily designed for low power short range communications, typically using low-cost transceiver microchips embedded in devices. Devices may be assigned a class based upon the maximum permitted power, which defines an effective transmission range. Class 1 devices have a range of approximately 1 m, class 2 devices have a range of approximately 10 m, and class 3 devices have a range of approximately 100 m. As Bluetooth is a radio frequency based system, communications between devices need not be line of sight. Version 1.2 of the specification provides for data rates of 1 MBit/s and version 2.0+EDR, provides for a data rate of 3 MBit/s. Version 2.1 of the specification was adopted on Jul. 26, 2007 and includes Simple Secure Pairing to increase security during pairing. Version 3.0+HS was adopted on Apr. 21, 2009 and includes high speed data transfers of up to 24 Mbit/s through use of a Bluetooth negotiated IEEE 802.11 link. Version 4.0 was adopted on Jun. 3, 2010, and includes support for Bluetooth low energy (BLE, previously known as Wibree). Devices which implement the Bluetooth specification will be referred to as Bluetooth enabled devices.

Bluetooth devices are assigned a unique Bluetooth Device Address (BD_ADDR) which is a 48 bit address assigned from the IEEE Registration Authority. The address is comprised of three fields—the lower address part consisting of 24 bits (LAP), the upper address part consisting of 8 bits (UAP), and the non-significant address part consisting of 16 bits (NAP). The LAP is company assigned, and the UAP and NAP form a company ID. There are 64 contiguous LAP values reserved for inquiry operations.

All Bluetooth transmissions over the physical channel begin with an access code based upon the LAP of a device address or an inquiry address. The device access code (DAC) is used during paging. Only the Bluetooth device address is required to set up a connection. To establish new connections a paging procedure is used in which a device makes a page scan using the Bluetooth device address of the target. The Bluetooth device address may be obtained from user interactions, or via an Inquiry procedure, in which a device asks for the Bluetooth device addresses of all nearby devices (additional information is also provided). Individual devices can choose whether or not to respond to Inquiry requests.

To enable the establishment of a secure connection between two Bluetooth devices, the Bluetooth specification defines Security Mode 3 which is a link level security mode. A bond is created between the devices by creating, exchanging and storing a common link key (K) which is associated with the Bluetooth Device Address of the other device and such devices are said to be bonded or paired. The common link key is used in authentication procedures during the establishment of a secure connection between the two devices, and is also used to generate an encryption key for encrypting data sent over the connection.

The Bluetooth specification defines a pairing procedure (LMP-Pairing, also known as simple pairing) which may be performed for the purpose of generating and storing the link key for later use (this is known as bonding), or as part of the procedure for establishing a secure connection between two devices. The pairing procedure involves creating an initialisation key $K_{init}$ in both devices, using this to create a combined link key $K_{AB}$, and then mutually authenticating the generated combined link key before allowing establishment of a secure connection.

Generation of initialisation is performed by the first device (A) sending a 128 bit random number (IN_RAND) to the second device (B). Each device then creates an initialisation key $K_{init}$ using the Bluetooth Device Address of the first device ($BD\_ADDR_A$), the random number generated by the first device (IN_RAND) and a (typically 4 digit) PIN code known to both devices. After the generation of the initialisation key, a combined link key ($K_{AB}$) is generated. Both devices choose a 128 bit random number ($LK\_RAND_A$, $LK\_RAND_B$) which is bitwise xor'ed with the initialisation key $K_{init}$ and then sent to the other device. Each device then extracts the other device's random number and a common link key is created based on ($LK\_RAND_A$, $LK\_RANT_B$, $BD\_ADDR_A$, $BD\_ADDR_B$). Finally, a mutual authentication step is performed.

In a mutual authentication step, a first device chooses a 128 bit random number ($AU\_RAND_A$) as a challenge and sends it to the second device. The second device creates a 32 bit word $SRES'_A$ using ($AU\_RAND_A$, $BD\_ADDR_B$, $K_{AB}$) which is sent back to A. A makes its own calculation of $SRES_A$ using the same input, and compares the two numbers. If $SRES_A$ and $SRES'_A$ agree, the process is repeated but with the roles of A and B switched (ie B initiates and A responds). This mutual authentication procedure is also used by two paired devices when they are establishing any future secure connections (in which case a link key already exists and does not have to be regenerated).

A problem with the pairing procedure is that if a third party eavesdrops on the whole pairing procedure, they can perform brute force calculations through the space of all available PINs and obtain the link key. For example a four digit pin can be cracked in 63 milliseconds using a 3 GHz Pentium IV processor. Version 2.1 of the Specification defines Secure Simple Pairing to provide passive eavesdropping protection through the use of public key cryptography system. Devices exchange public keys, and use one of 4 protocols to exchange information which is used to generate a shared key. A link key is then calculated from the derived shared key and publicly exchanged data. This makes the task of obtaining the link key a considerably more difficult problem than previously, but in most cases it is still susceptible to a "Man in the Middle" attack.

Whether pairing is performed according to the more secure Version 2.1 specification, or earlier less secure versions, a problem exists that either device can control when a new link key is generated. In some situations in which devices are issued to users, it may be desirable that pairing of devices is performed in a controlled or supervised situation, and that further unauthorised (re)pairing is prevented. The present applicants addressed the issue of establishing a secure Bluetooth connection in Singaporean Patent Application Number 2008057382 (granted as Singapore Patent No. 158780), the entire content of which is hereby incorporated by reference.

Whilst this approach provides secure bonding between the two devices, and prevents tampering of the link, this does not provide secure access control to the devices, or even guarantee that the devices are issued to appropriate personnel, for example if the user and issuer collude, or if a user inappropriately obtains the secret key allowing him to self-issue a pair of devices. There is thus a need to provide secure access control systems and methods for establishing and/or monitoring a secure connection between two Bluetooth enabled devices.

BRIEF SUMMARY

According to a first aspect of the present invention, there is provided a method for securely controlling access to two Bluetooth enabled apparatuses, the method including:
storing a link key in a first Bluetooth enabled apparatus having a first Bluetooth device address ($BD\_ADDR_1$);
storing a partial link key in a second Bluetooth enabled apparatus having a second Bluetooth device address ($BD\_ADDR_2$);
receiving, by the first Bluetooth enabled apparatus, a first user verification information and storing a first user identifier;
receiving a secret key by the second Bluetooth enabled apparatus;
generating a copy of the link key in the second Bluetooth enabled apparatus using the stored partial link key and the received secret key.
associating the generated link key in the second Bluetooth enabled apparatus with the Bluetooth device address of the first Bluetooth enabled apparatus ($BD\_ADDR_1$); and
associating the stored link key in the first Bluetooth enabled apparatus with the Bluetooth device address of the second Bluetooth enabled apparatus ($BD\_ADDR_2$);
establishing a secure Bluetooth connection between the first and second Bluetooth enabled apparatuses using the link key;
sending, from the first Bluetooth enabled apparatus to the second Bluetooth enabled apparatus, the first user identifier;
sending the first identifier to a verification authority in communication with the second Bluetooth enabled apparatus,
determining, by the verification authority, whether the first user identifier is authorized to use the first and second Bluetooth enabled apparatuses;
receiving, by the second Bluetooth enabled apparatus, a verification status message, wherein if a successful verification status message is received use of the Bluetooth enabled apparatuses is allowed, and if a unsuccessful verification status message is received the use of the Bluetooth enabled apparatuses is denied.

According to a second aspect of the present invention, there is provided a Bluetooth enabled apparatus, the apparatus including:
a Bluetooth communications module;
a memory for storing a link key;
a user input module for receiving user verification information and for storing a user identifier obtained from the user verification information in the memory;
a processor configured to establish a secure Bluetooth communications link with a second Bluetooth enabled apparatus using the stored link key, and provide the user identifier to the second Bluetooth enabled apparatus over the secure Bluetooth communications link for provision to a verification authority to determine whether the user identifier is authorized to use the first and second Bluetooth enabled apparatuses.

According to a third aspect of the present invention, there is provided a Bluetooth enabled apparatus, the apparatus including:
a Bluetooth communications module;
a memory for storing a partial link key;
a user input module for receiving a secret key;
a key generator for generating a link key using the partial link key and a received secret key;
a wireless communications module;
processor configured to establish a secure Bluetooth communications link with a second Bluetooth enabled apparatus using the generated link key, and to receive a first user identifier from the second Bluetooth enabled apparatus over the secure Bluetooth communications link, and to establish a communications link with an external verification authority using the wireless communications module, and to send the received user identifier to the verification authority, and to receive a verification status message from the verification authority.

According to a fourth aspect of the present invention, there is provided a Bluetooth enabled apparatus, the apparatus including:
a Bluetooth communications module;
a memory for storing a partial link key;
a user input module for receiving a secret key and a first user verification information and to store a first user identifier obtained from the first user verification information in the memory;
a key generator for generating a link key using the partial link key and a received secret key;
a verification authority module;
a processor configured to establish a secure Bluetooth communications link with a second Bluetooth enabled apparatus using the generated link key, and to receive a second user identifier from the second Bluetooth enabled apparatus over the secure Bluetooth communications link, and to send the first user identifier and the second user identifier to the verification authority module, and to receive a verification status message from the verification authority module.

According to a fifth aspect of the present invention, there is provided a system for securely controlling access to two Bluetooth enabled apparatuses, the system including:

a first Bluetooth enabled apparatus including:
  a first Bluetooth communications module;
  a first memory for storing a link key;
  a first user input module for receiving user verification information and for storing a user identifier obtained from the user verification information in the memory;
  a first processor configured to establish a secure Bluetooth communications link with a second Bluetooth enabled apparatus using the stored link key, and provide the user identifier to the second Bluetooth enabled apparatus over the secure Bluetooth communications link;
a second Bluetooth enabled apparatus including:
  a second Bluetooth communications module;
  a second memory for storing a partial link key;
  a second user input module for receiving a secret key;
  a key generator for generating a link key using the partial link key and a received secret key;
  a second processor; and
a verification authority;
wherein the first processor is configured to establish a secure Bluetooth communications link with the second Bluetooth enabled apparatus using the stored link key and the generated link key, and to receive a first user identifier from the first Bluetooth enabled apparatus over the secure Bluetooth communications link, and to send the first user identifier to the verification authority, and to receive a verification status message from the verification authority module.

According to a sixth aspect of the present invention, there is provided a computer program product including at least one computer readable medium comprising instructions for performing the method of the first aspect.

BRIEF DESCRIPTION OF THE DRAWINGS

Various embodiments of the present invention will be discussed with reference to the accompanying drawings wherein:

FIG. 1A is an embodiment of a Bluetooth enabled apparatus for use in a system for controlling access to two Bluetooth apparatuses;

FIG. 1B is an embodiment of a second Bluetooth enabled apparatus for use in a system for controlling access to two Bluetooth apparatuses;

FIG. 1C is an embodiment of a system for controlling access to two Bluetooth apparatuses;

FIG. 1D is another embodiment of a system for controlling access to two Bluetooth apparatuses.

In the following description, like reference characters designate like or corresponding parts in the drawings.

DETAILED DESCRIPTION

Figure 2:
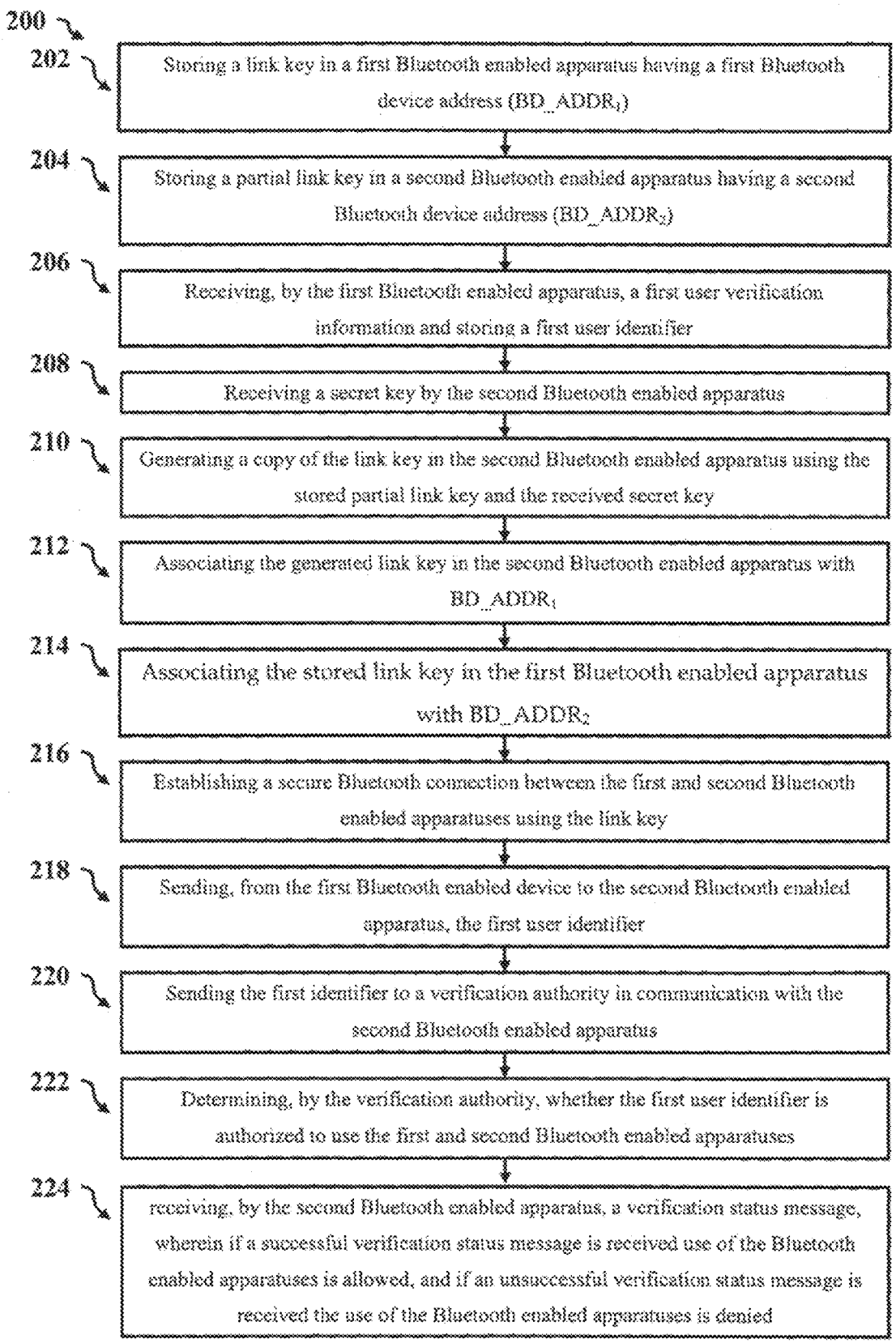
FIG. 2 is a flowchart of a method for use in a system for controlling access to two Bluetooth apparatuses.

Systems and method described herein provide secure access control systems and methods for establishing and/or monitoring a secure connection between two Bluetooth enabled apparatuses or devices), which may be issued to users. The terms apparatus will be used interchangeably with device, and the described functionality may be provided in a single component or housing or be comprised of multiple components which may be distributed provided they are functionally connected, such as by cables, wires, or wireless links. For example in a security or policing setting, an officer may be issued with a weapon (eg pistol, Taser, baton, etc) and a holster, or other controlled equipment, at the start of a shift and are then free to move around an operational area. A supervising authority, such as a dispatch centre or central monitoring facility, may wish to monitor when the weapon is removed from its holster so that further assistance can automatically be provided to the officer, to allow notification of a supervisor so that further orders can be issued or to allow closer monitoring of a developing situation, or simply to act as a deterrent to ensure the Officer does not use the weapon inappropriately.

Such a system can be implemented by fitting a Bluetooth enabled sensing apparatus (the first Bluetooth enabled apparatus) which includes a sensor such as a weapon status sensor which is issued to the user along with the weapon and holster. This may be a sensor which monitors if the weapon is in the holster, or it may sense the status of a holster clip to detect when the clip is unclipped to allow a weapon to be removed, such as by the use of an electromagnetic proximity sensor, or a continuity sensor. The officer can then be issued with a Bluetooth enabled mobile telephone or other Bluetooth enabled communications apparatus (ie a second Bluetooth enabled apparatus). The two Bluetooth apparatuses are securely paired (bonded) and a secure Bluetooth communication link is then established between the apparatuses when the apparatuses are issued to the Officer (the user).

The mobile telephone sends and receives information to and from the supervising authority using a wireless telephone connection. An application running on the mobile telephone can monitor the status of the link to the sensor and generate messages or alerts to the supervising authority. For example when the officer unclips or draws their weapon an alert is sent to the supervising authority who may then take further action as appropriate (eg provide further assistance, or communicate with the officer). If there is a loss of the Bluetooth link, such as the holster monitoring apparatus no longer being in Bluetooth communications range with the mobile telephone apparatus then an alert may be sent to the supervising authority who can then take further action as appropriate.

Referring now to FIGS. 1A to 1D, there a shown various embodiments of a system for controlling access to two Bluetooth apparatuses. FIG. 1A illustrates an embodiment of a first Bluetooth enabled apparatus 110 which includes a sensor, such as a sensor for monitoring the status of a weapon, and FIG. 1B illustrates an embodiment of a second Bluetooth enabled apparatus 120 which includes a wireless communications module, such as a mobile phone communications module. To ensure that the two apparatuses are securely bonded, and to prevent tampering of the bond (secure connection) the generation of the link keys in the apparatuses is controlled so that they need not be sent over a wireless link where they could be intercepted. The link key is a 128 bit number as defined in the Bluetooth Specification (ie 128 bit random number), and thus is suitable for performing authentication and generation of encryption keys for supporting establishment of secure paired connections between apparatuses using the Bluetooth specification.

The first Bluetooth enabled apparatus 110, includes a Bluetooth communications module 111 which includes a modified implementation of the Bluetooth Specification which disables use of the standard bonding procedure used to generate a link key, and a link key 112 which is loaded into a memory or storage component 113 included in the apparatus. Such a memory or storage component may include RAM, ROM, a memory card, firmware chip, or other suitable means for storing information. The apparatus further includes a microprocessor 114 or microcontroller for controlling operation of the apparatus and a sensing module 115 which may include a sensor integrated into or connected to the apparatus via a wired link, such as a sensor for monitoring the status of a weapon in a holster.

The first apparatus further includes a user input module 116, which may be an input apparatus such as a keypad (which may be numeric, alphanumeric, symbolic, etc), a keyboard, a biometric scanner, or a near field reader (eg for a secure ID token). The input apparatus may be integrated into the apparatus, connected using a wired connection (eg USB or other cable), or over a wireless connection such as a Bluetooth, WiFi, mobile telecommunications link or other radio frequency or IR link. Security of the system is enhanced if the input apparatus is integrated or connected over a wired connection to reduce the risk of eavesdropping or spoofing.

Referring to FIG. 1B, the second Bluetooth enabled apparatus 120 includes a Bluetooth communications module 121 which includes a modified implementation of the Bluetooth Specification which disables use of the standard bonding procedure used to generate a link key. Additionally in this embodiment the second apparatus also includes a wireless communication module 130 to enable communication with other apparatuses, such as over a mobile or a long range RF communication link. In other embodiments as discussed below, the wireless communication module 130 may be omitted. The apparatus also includes a user input module 122, a storage component or memory 123 and a microprocessor or microcontroller 124 for controlling operation of the apparatus. The input module 122 may be an input apparatus such as a keypad, a keyboard, a biometric scanner, or a near field reader, and may be integrated into the apparatus, or connected using a wired or a wireless connection. Many Bluetooth enabled apparatuses such as mobile computing apparatuses (eg tablets, laptops, mobile phones, trunked radio handsets etc) include a user input apparatus, a microprocessor and a memory and these in built features can be configured for use with the methods described herein.

The second apparatus 120 includes a link key generator 125 for generating a link key based upon a partial link key (PLK) 126 stored in a storage component included in the apparatus and a secret key 127 received via the user input component 122. In this embodiment the apparatus stores the partial link key 126 associated with link key 112 stored in the first Bluetooth enabled apparatus 110 so that an identical copy of the link key 112 can be generated on reception of the secret key 127. The link key generator 125 may comprise hardware, software or a combination thereof, and may be implemented within one or more general purpose processors, microprocessors, application specific integrated circuits (ASICs), programmable logic apparatuses (PLDs), field programmable gate arrays (FPGAs), or other electronic units designed to perform the function of generating a link key. The link key may be generated using known cryptographic methods that use two input numbers, such as the E2 or E3 key generation functions used in the Bluetooth specification. Security of the system is enhanced if the secret key is provided over non wireless means to reduce the risk of eavesdropping or spoofing.

Upon receipt of the secret key and generation of the link key 112 the two Bluetooth apparatuses can be securely bonded using the (common) link keys to enable generation of a secure Bluetooth connection between the two apparatuses. FIG. 1C illustrates a secure Bluetooth communications link 141. That is the apparatuses will be able to mutually authenticate each other using the stored common link key. The generated link key in the second apparatus is associated with the Bluetooth device address of the first Bluetooth enabled apparatus ($BD\_ADDR_1$) and the association stored in the storage component. This may replace a previously stored link key associated with $BD\_ADDR_1$. The apparatus may further include a key generation controller which prevents replacement of the generated link key associated with $BD\_ADDR_1$ if the replacement key was not generated by the link key generator. This may involve disabling the LMP-Pairing procedure or the Secure Simple Pairing procedure in the implementation of the Bluetooth Specification included in the apparatus. Similarly the first Bluetooth enabled apparatus associates the stored link key with the Bluetooth device address of the second Bluetooth enabled apparatus ($BD\_ADDR_2$) and stores the association in the storage component (ie memory) of the second apparatus.

Whilst this approach provides secure bonding between the two apparatuses, and prevents tampering of the link, this does not provide secure access control to the apparatuses, or even guarantee that the apparatuses are issued to appropriate personnel. To provide basic access control, the secret key 127 may only be known (or provided) to the person issuing the apparatuses or the user's supervisor so that the end user (the Officer) that is issued with the two Bluetooth apparatuses is unable to disable the Bluetooth link or otherwise tamper with the link. However even this system is subject to possible attack or subversion such as by collusion by a user and issuer, or by a user who inappropriately obtains the secret key allowing them to self-issue the apparatuses. Thus to provide more secure access control and additional redundancy, the system further includes steps to ensure that the apparatuses are only issued to appropriately authorised users and optionally, only at appropriate times such as for a scheduled shift.

Such an access control system can be provided through the use of user verification information which is a logical identity uniquely associated with each user with the overall apparatus issuing system. The user verification information will typically be a public identification component such as a username, or issued ID token which can be entered into or scanned by the apparatus, and an associated private or user specific component, such as a password or a biometric property of the user (eg fingerprint, retinal scan). The logical identity will be primarily stored by a verification authority 146 (discussed below) which will typically be located at a remote location from where the apparatuses are issued, and will typically be used by the user and the issuer to access computing systems and information of the overall apparatus issuing system. The user who wishes to be issued the apparatuses enters user verification information 117, such as user name and password to the first Bluetooth apparatus 110 using the user input apparatus of the user input module 117 (eg keypad). Similarly the issuer can enter their user verification information 128 into the second apparatus using the user input component 122 along with the secret key 127, when issuing the apparatuses.

The received user verification information (eg user name and password) is stored as a user identifier in the apparatus. For example in FIG. 1A, the user identifier 118 for the user is stored in the memory 113 of the first apparatus, and in FIG. 1B the user identifier 129 of the issuer is stored in the memory 123 of the second apparatus. The user identifiers may be temporarily stored for the duration of the verification process, or stored semi-permanently until the Bluetooth connection 141 is disabled or torn down (eg once the apparatuses are returned to the issuing authority). The user identifier may be the received user verification information stored in plain text, or it may be generated by further processing of the received user verification information. Such further processing may be performed for security and/or storage reasons and may include compressing the received information, encrypting some or all of the received information, or using some or all of the received information to generate further information. For example if the user verification information is a username and password, then it is preferable that the password is stored in an encrypted form such as through the use of a cryptographic hash algorithm which generates a hash value which is stored in place of the password on the apparatus. This stored hash value can be sent in plain text and compared with the hash value stored in a password database for the associated username which is maintained remote of the apparatus, such as at the supervising authority. Other cryptographic or password security approaches may be used such as using the received user verification information to generate a password authenticated key which can be used in a key exchange process to verify the authenticity of the received user verification information.

As illustrated in FIG. 1C, once the secret key 127 (see FIG. 1B) is entered into the second apparatus and a secure Bluetooth connection 141 is established between the two apparatuses, then the first Bluetooth enabled apparatus is configured to send a message 142 including the first user identifier 118 to the second Bluetooth enabled apparatus 120. Upon reception of the first user identifier 118, the second Bluetooth enabled apparatus is configured to use the wireless communication module 130 to establish a wireless communications link 143 with a verification authority 146. The first user identifier 118 and the second user identifier 129 are then sent via a message 144 to a verification authority in communication with the second Bluetooth enabled apparatus. In some embodiments, just the first user identifier 118 is sent to the verification authority, and the user identifier for the issuer is not sent (in which case the user verification information for the issuer does not need to be received by the second Bluetooth enabled apparatus 120).

The verification authority is preferably a computer server, program, database or other system which stores verification information for a plurality of users such as usernames and passwords, or information derived from such information, and can verify whether a received user identifier agrees or matches with information stored by the system. In this embodiment the verification authority is located at a remote monitoring facility 145. In other embodiments the verification authority 146 is independent of the remote monitoring facility 145. Preferably the verification authority is in communication with the remote monitoring facility so that the remote monitoring facility can be notified or alerted to any failed verification attempts, repeated failed attempts, or other unusual activity (for example issuing of all weapons at a site). The verification authority may be a component of the Information Technology (IT) systems of the overall monitoring system, and used to allow general access to IT facilities of the overall system. That is the user name and password may be used to login onto other computers of the overall system.

After determining (or verifying) if a received user identifier (or identifiers) matches the stored verification information, a verification status message 149 is sent back to the second Bluetooth enabled apparatus by the verification authority over the communications link 143 indicating successful or unsuccessful verification of the received user identifier or identifiers). The second Bluetooth enabled apparatus 120 can then optionally send the verification status message 149 back to the first Bluetooth enabled apparatus 110 over the secure Bluetooth communications link 141. If the received information agrees with the stored information, or with data obtained from the stored information, such as hash value or password encoded key, then a successful verification status message is returned. If user identification information is provided for both the first user (eg the user of the apparatuses) and the second user (the issuer of the apparatuses) then either a single verification status message may be sent verifying both users, or separate verification status messages may be sent for each user. If the first user is verified and authorized to be issued (and use) the apparatuses, the second Bluetooth enabled apparatus can report the verification status message to the issuer, such as by displaying an authorization message, or using an indicator (eg green LED) to indicate that the apparatuses should be issued, or if the verification fails, then a message is provided to the issuer to indicate that the apparatuses should not be issued or by using a fail indicator (eg red LED).

A flowchart 200 of a method for securely controlling access to two Bluetooth enabled apparatuses, according to an embodiment described herein is illustrated in FIG. 2. The method begins by storing a link key in a first Bluetooth enabled apparatus having a first Bluetooth device address ($BD\_ADDR_1$) at step 202 and by storing a partial link key in a second Bluetooth enabled apparatus having a second Bluetooth device address ($BD\_ADDR_2$) at step 204. At step 206 the first Bluetooth enabled apparatus receives a first user verification information, and stores a first user identifier. At step 208 the second Bluetooth enabled apparatus receives a secret key and at step 210 proceeds to generate a copy of the link key (in the second Bluetooth enabled apparatus) using the stored partial link key and the received secret key, and at step 212 associates the generated link key in the second Bluetooth enabled apparatus with the Bluetooth device address of the first Bluetooth enabled apparatus ($BD\_ADD_1$). Similarly at step 214 the first Bluetooth enabled apparatus associates the stored link key (in the first Bluetooth enabled apparatus) with the Bluetooth device address of the second Bluetooth enabled apparatus ($BD\_ADDR_2$). At step 216 a secure Bluetooth connection is established between the first and second Bluetooth enabled apparatuses using the common link key. Once the connection is established, at step 218 the first Bluetooth enabled apparatus sends the first user identifier, to the second Bluetooth enabled apparatus and at step 220 the second Bluetooth enabled apparatus sends the first identifier to a verification authority in communication with the second Bluetooth enabled apparatus. At step 222, the verification authority verifies whether the first user identifier is authorized to use the first and second Bluetooth enabled apparatuses. At step 224 the second Bluetooth enabled apparatus receives a verification status message, wherein if a successful verification status message is received use of the Bluetooth enabled apparatuses is allowed, and if an unsuccessful verification status message is received the use of the Bluetooth enabled apparatuses is denied.

Other variations and modifications may be made. For example the flowchart in FIG. 2 could be modified to include a step 207 of receiving, by the second Bluetooth enabled apparatus, a second user verification information and storing a second user identifier, and step 220 could be modified to include the second Bluetooth enabled apparatus sending the second user identifier with the first user identifier to the verification authority. These additional steps could be performed for the embodiment shown in FIG. 1C in which the verification authority is external to the second Bluetooth enabled device, or for the embodiment shown in FIG. 1D, in which the verification authority is internal to the second Bluetooth enabled apparatus. In this embodiment, the second Bluetooth enabled apparatus will comprise hardware and/or software such as an internal database or file containing verification information for users of the issuing system, and associated routines for interrogating the records in the database. In another embodiment the internal verification authority may be a copy of some or all of the verification information stored primarily in another location, such as a central server for the issuing and monitoring system. For example just the password database could be stored, or both the password and schedule databases, or, if there are multiple sites which issued apparatuses, just the passwords and schedules for users associated with a specific site. In this case it is preferable that the second user (the issuer) is required to enter their user identification information to ensure that the apparatuses are being issued by an authorised user.

In another embodiment the step of determining if a first user is authorised to use the first and second Bluetooth enabled apparatus further comprises checking other information in addition to the user verification information to determine if the user is authorised to use the first and second Bluetooth enabled apparatuses. This other information may be scheduling information, user certification information, position information, etc.

In one embodiment the verification authority 146 further includes, or is in communication with a database or storage device storing scheduling information on when users are scheduled to use issued apparatuses. When a request to verify a user is made, the verification authority can check if the user is authorised to use or be issued the apparatuses at the current time. If the user is both known to the system and is authorised to use or be issued the apparatuses then a successful verification message can be sent. If the user is either not known, or not authorised to use or be issued the apparatuses at that time, then an unsuccessful verification message can be sent. Additionally the time period for which a user is authorised to be issued with an apparatus may be sent back to the second apparatus for display or provision to the issuer in message 149. Additionally information regarding each verification request and the result can be provided to the monitoring authority. If excessive numbers of attempts are detected or other unusual behaviour, then a warning can be issued.

In another embodiment a database of user certification information containing information on which apparatuses users are trained or certified to use. For example in the case of weapons, some users may only be trained to use specific weapons (eg batons, Taser, handgun, shotgun, rifle, etc), and thus the system can be used to ensure that officers are only verified to be issued with apparatuses they are trained to use. Additionally the verification system may be used to store tracking data on which apparatuses users are issued. In these embodiments an identifier of the Bluetooth apparatus such as their Bluetooth address, a MAC address, or a serial number of the apparatuses to be issued are also sent to the verification authority with the user identifier.

In another embodiment the other information may be the physical location of the first and/or second apparatuses. The verification system may comprise or be in communication with a database or a storage means storing the location of issuing authorities and their inventories, or alternatively an expected or known location may be stored for each apparatus. In one embodiment the first and/or second apparatus includes a location determination means for determining a geographic location of the apparatus. This may be a GPS receiver (autonomous or assisted), a local positioning system receiver, or a module which utilises wireless positioning techniques. The location of the first and/or second apparatus can then be sent via the second apparatus to the verification authority along with the first user identifier (either as part of the same transmission or a later transmission). The verification authority can then compare the received position with the stored or expected location from the database with the current location of the apparatus, and a successful verification message only sent back if the received and stored locations match. The match may be based upon a predefined tolerance or range, such as the two locations being within 10 or 50 m of each other. The tolerance may be determined based upon the accuracy of the location determination means.

In another embodiment the mobile phones location may be determined by the mobile phone network, such as position based upon measurements of signals from the mobile phone by base stations or other network elements. Such a position could be provided to the mobile phone and sent to the verification authority, or alternatively, the verification authority could obtain this information directly from the mobile phone network (to prevent possible tampering). Thus in response to a user verification request received from a mobile telephone, the verification authority could independently obtain the location of the mobile telephone from the network and compare this with the stored location.

Other variants of these methods could be used based upon knowledge of other apparatuses at the issuing authority. For example instead of providing a location, the apparatus could provide a token identifying another apparatus whose location is known to the verification authority (eg stored in a database) within communication range of the issuing authority (and thus first or second apparatus). For example a public WIFI access point may be located within range of the issuing authority or the issuing authority may have a short range WI-FI access point co-located with and operated by the issuing authority. If one of the first or second apparatuses has WIFI capabilities, this apparatus could detect a unique identifier of the WIFI access point, such as MAC address, and provide this as an identification token to the verification authority instead of a location. The verification authority could then lookup location data associated with the received token in a database to verify the location of the first and/or second apparatus and issue an appropriate verification status message.

Finally various combinations of information in addition to the user identified could be used in the verification process, such as a combination of position, schedule, and certification information.

In some embodiments various functions of the apparatuses may be inhibited or disabled unless a successful verification status message is received. For example if one apparatus is a mobile phone then the ability to make a call may be denied, or only certain numbers may be called, such as emergency calls and/or calls to a supervisor or monitoring centre 145. In another embodiment the first apparatus is a secure card reader and the second apparatus is tablet. If an unsuccessful verification message is received then card reading functionality could be disabled. In another example the first Bluetooth enabled apparatus may be a module fitted to a weapon which either prevents taking the weapon out of a holster, or disables firing of the weapon.

The proposed system and methods could be used with a range of Bluetooth enabled apparatuses or to create a range of secure monitoring systems. For example the first Bluetooth enabled apparatus could be an attachment to a holster with wired connection to sensors installed on the holster to monitor status of the holster (for example, clip on and off), or a Bluetooth-enabled sensor attached to a human body, clothing, vehicle, or any other object whose status is to be monitored. The second apparatus can then be a Bluetooth-enabled mobile communication apparatus such as a mobile phone, a trunked radio handset, a PC tablet, a mobile computing apparatus, etc, which can communicate with a supervising authority or monitoring centre. In another embodiment the first apparatus may be a Bluetooth-enabled smart card reader and the second apparatus is a Bluetooth-enabled computing apparatus such as a PC tablet, a smart phone, or any other mobile computing apparatus. For example some tablet computing apparatuses lack USB or other external data connectors and thus cannot be securely connected to smart card readers. Cryptographic data is stored on smart cards, and thus there needs to be a way for a tablet to securely read and write data to a contact smart card via an external smart card reader. The proposed method provides a way to securely establish a Bluetooth connection for secured transmission of data between the smart card reader and a mobile computing apparatus.

Various other modifications may be made to the proposed system. For example the second Bluetooth enabled apparatus 120 may include a plurality of partial link keys, wherein each partial link key has an associated lookup key. If this lookup key is provided to apparatus with the secret key then the link key generator may use the lookup key to select the partial link key to be used to generate the link key. Again security is enhanced if the secret key is provided via non wireless means such as via a keypad. Apparatuses may be divided into sets of apparatuses in which apparatuses in the same set share the same link key.

In other embodiments, other methods may be used for establishing a secure Bluetooth connection between the two Bluetooth apparatuses that does not require transmission of a link key between the two apparatuses. With reference to the flowchart in FIG. 2, steps 204 and 212 could be modified to store a copy of the link key stored in the first Bluetooth apparatus (rather than a generated link key), and steps 208 and 210 omitted. In another variation, both apparatuses could store partial link keys, and secret keys could be entered into both apparatuses to allow generation of a common link key (ie step 202 modified to store a PLK, and steps 208 and 210 repeated for the first apparatus). The two stored partial link keys could be identical, in which case the same secret key is used, or alternatively the two partial link keys could be different, and have different keys, with the requirement being that each partial link key and secret key generates the same (common) link key.

A key generation controller may also be used to prevent replacement of a generated link key. The controller may optionally prevent any replacement or just replacement by link key generated by some other means. The use of the key generation controller may be activated or deactivated using a password or other instruction to allow an administrator to control this functionality. Apparatuses may also be modified so that they will only respond to a Bluetooth Device Inquiry from another apparatus, or allow establishment of a Bluetooth link with another apparatus, if a predetermined portion of Bluetooth device address (BD_ADDR) of the other device is in a list of approved address portions. This may for example be based on the lower address part (LAP) of the Bluetooth device address (BD_ADDR). The LAP is assigned to manufacturers and in this way communication can be restricted to apparatuses from the same manufacturer or from other approved manufacturers by storing a list of approved LAP's in the apparatus.

An application running on the second Bluetooth apparatus can be used to monitor the status of the Bluetooth link and the sensor in the first Bluetooth apparatus. Status messages can be sent to a supervising authority 145 at regular intervals, or in response to a status change. Messages can be resent if not acknowledged. The issuing authority may also run a software application (the issuing application) to monitor which apparatuses are issued to which personnel, and to store secret keys associated with each apparatus. The issuing authority could use the application to look up the secret key associated with the second apparatus, either within the application, or via a server or database the application is in communication with, and the application could send the secret key over a wired connection. Alternatively the issuing authority could look up the key using the application and manually enter it into the key pad of the second apparatus.

In another alternative an interface apparatus may store the secret key for the second apparatus (temporarily or over an extended period). The interface apparatus may be connected to the second apparatus using a wired connection and send the secret key to the second apparatus over the wired connection upon a suitable instruction. The instruction may be via a button, keypad, or similar input means on the interface apparatus, or an application running on the second apparatus may recognise the interface apparatus and request the secret key. Such an interface apparatus may also be used to allow the user to enter their user verification information into the first apparatus.

Further the issuer could provide their user identification information (ie login credentials such as username and password) to the issuing application, which can then be verified with the verification authority. When apparatuses are to be issued to a user, apparatus identification information such as a serial number, bar code, or Bluetooth address could be recorded by the issuing application, and this information could then be provided to the verification authority along with the user identifier of the issuer. This information can then be checked against the information received over the communications link between the second Bluetooth apparatus and the verification authority. Verification status messages could also be sent to the issuing application to inform the issuer. Further the issuing application could be linked up to lockers with electronic locks. The lockers could be used to securely store the apparatuses to be issued. The lockers could also include an input apparatus which is connected up to the stored apparatuses to provide the user input component (ie 116 in FIG. 1A or 122 in FIG. 1B). This would enable the system to be automated or distributed and remove the need for an issuer to be at the issuing location. A user could approach a locker at the start of their shift and enter their login details. These are then sent to the verification authority for verification. Optionally a supervisor at a remote monitoring centre could be notified and the secret key provided to the second Bluetooth apparatus.

The methods, apparatuses and systems described herein advantageously provide secure access control systems and methods for establishing and/or monitoring a secure connection between two Bluetooth enabled apparatuses. The use of user identifiers as part of the apparatus issuing process ensure that apparatuses are only issued to authorised users at authorised times, and the apparatus issuing process can be further monitored and controlled.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device or apparatus. The software codes may be stored in a memory unit and executed by a suitably configured processor. The memory unit may be implemented within the processor or external to the processor, in which case it can be communicatively coupled to the processor via various means as is known in the art.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that various modifications can be made without departing from the principles of the invention. Therefore, the invention should be understood to include all such modifications in its scope.

What is claimed is:

1. A Bluetooth enabled apparatus, the apparatus including:
a Bluetooth communications module;
a memory storing a partial link authorization key;
a user input module receiving user verification information and storing a user identifier obtained from the user verification information in the memory;
a processor configured to establish a secure Bluetooth communications link with a second Bluetooth enabled apparatus via the stored partial link authorization key, and provide the user identifier to the second Bluetooth enabled apparatus over the secure Bluetooth communications link for provision to a verification authority to determine whether the user identifier is authorized to use the first and second Bluetooth enabled apparatuses.

2. The apparatus as claimed in claim 1, wherein the user input module includes an integrated input device for receiving the user verification information.

3. The apparatus as claimed in claim 1, wherein the user input module further includes an external input device for receiving the user verification information.

4. The apparatus as claimed in claim 1 further including a sensor module.

5. The apparatus as claimed in claim 4, wherein the sensor module monitors a weapon status.

6. The apparatus as claimed in claim 4, wherein the processor is configured to receive a verification status message from the second Bluetooth enabled apparatus in response to sending the user identifier, and if the verification status message indicates unsuccessful verification, then one or more functions of the apparatus are disabled.

7. The apparatus as claimed in claim 1, wherein the Bluetooth enabled apparatus further comprises a position determination module.

* * * * *

UNITED STATES PATENT AND TRADEMARK OFFICE
CERTIFICATE OF CORRECTION

PATENT NO. : 9,848,288 B2  
APPLICATION NO. : 15/265503  
DATED : December 19, 2017  
INVENTOR(S) : Poh Beng Tan et al.

Page 1 of 1

It is certified that error appears in the above-identified patent and that said Letters Patent is hereby corrected as shown below:

In the Specification

<u>Column 4,</u>
Line 36, "processor configured to establish" should read --a processor configured to establish--.

<u>Column 10,</u>
Lines 40-41, "apparatus (BD_ADD$_1$)." should read --apparatus (BD_ADDR$_1$).--.

Signed and Sealed this  
Twenty-first Day of August, 2018

Andrei Iancu  
*Director of the United States Patent and Trademark Office*